(12) United States Patent
Spragg et al.

(10) Patent No.: US 6,420,005 B1
(45) Date of Patent: Jul. 16, 2002

(54) BAND ELEMENT FOR PNEUMATIC TIRE

(75) Inventors: Charles D. Spragg, Hudson; James M. Kirby, Akron, both of OH (US); Edward G. Markow, Jensen Beach, FL (US)

(73) Assignee: Bridgestone/Firestone North American Tire, LLC, Nashville, TN (US)

( * ) Notice: Subject to any disclaimer, the term of this patent is extended or adjusted under 35 U.S.C. 154(b) by 100 days.

(21) Appl. No.: 09/587,841

(22) Filed: Jun. 6, 2000

Related U.S. Application Data

(62) Division of application No. 09/213,170, filed on Dec. 17, 1998, now Pat. No. 6,112,791.

(51) Int. Cl.⁷ ................................................. B32B 1/08
(52) U.S. Cl. ..................................... 428/36.91; 152/533
(58) Field of Search .......................... 152/533, 516, 152/197; 428/36.91

(56) References Cited

U.S. PATENT DOCUMENTS

| | | | |
|---|---|---|---|
| 3,730,246 A | 5/1973 | Skala et al. | |
| 3,850,219 A | 11/1974 | Snyder | 156/123 |
| 4,111,249 A | 9/1978 | Markow | 152/330 RF |
| 4,258,774 A | 3/1981 | Mirtain et al. | |
| 4,310,043 A | 1/1982 | Inoue | |
| 4,318,434 A | 3/1982 | Markow | 152/156 |
| 4,428,411 A | 1/1984 | Markow et al. | 152/330 RF |
| 4,456,048 A | 6/1984 | Markow et al. | 152/330 RF |
| 4,459,167 A | 7/1984 | Markow et al. | 156/110.1 |
| 4,526,217 A | 7/1985 | Endo et al. | 152/527 |
| 4,734,144 A | 3/1988 | Markow | 156/123 |
| 4,794,966 A | 1/1989 | Markow | 152/516 |
| 5,201,971 A | 4/1993 | Gifford | 152/536 |
| 5,879,484 A | 3/1999 | Spragg et al. | 152/516 |

FOREIGN PATENT DOCUMENTS

| | | |
|---|---|---|
| EP | 0 101 400 | 2/1984 |
| EP | 0 115 129 | 8/1984 |
| EP | 0 191 124 | 8/1986 |
| EP | 0 537 780 | 4/1993 |
| EP | 0 853 009 A2 | 11/1997 |
| EP | 0 853 009 | 7/1998 |
| EP | 0 953 436 | 11/1999 |

OTHER PUBLICATIONS

Derwent Abstract of EPO Publication 0 191 124 * Aug. 1986.

*Primary Examiner*—Alexander S. Thomas
(74) *Attorney, Agent, or Firm*—Thomas R. Kingsbury; Michael Sand

(57) ABSTRACT

A run flat pneumatic tire has a thin annular band embedded in a crown portion of the tire. The band preferably is a composite member formed of a plurality of layers elongated strip material providing the band with inner and outer annular axially extending surfaces terminating in a pair of outer end portions. Either one or both of the outer end portions are tapered toward the other end portion and toward a pair of end edges to reduce interlaminar shear. The end edges can be straight or rounded surfaces and the tapered outer end portions may be coated with fiber filled epoxy coating.

11 Claims, 5 Drawing Sheets

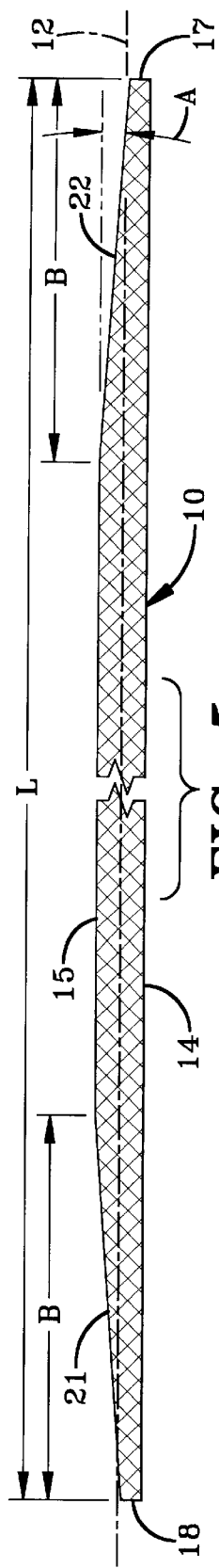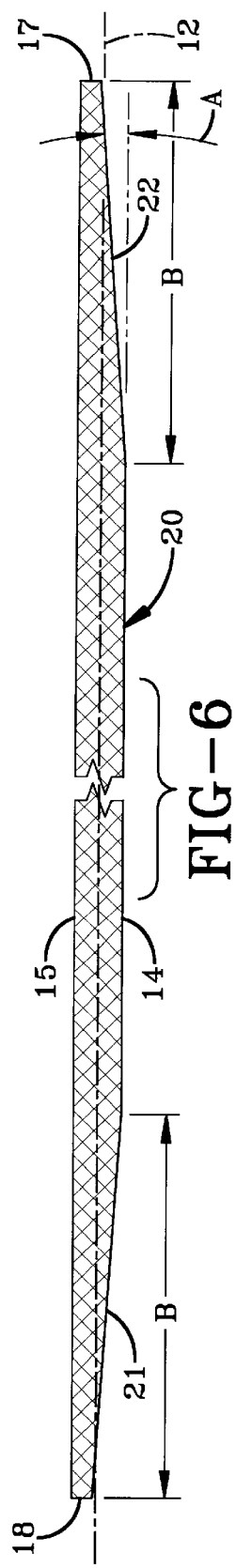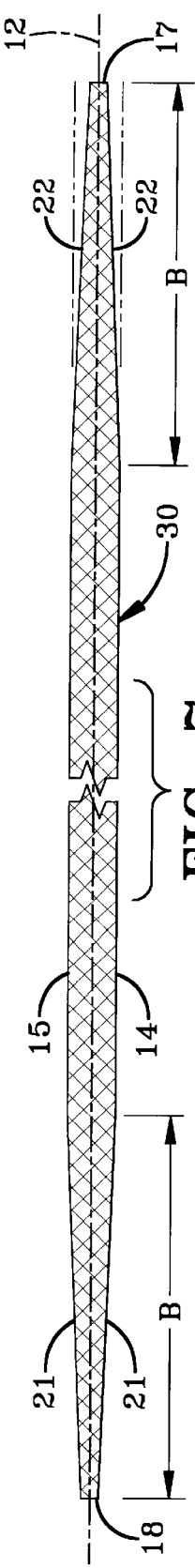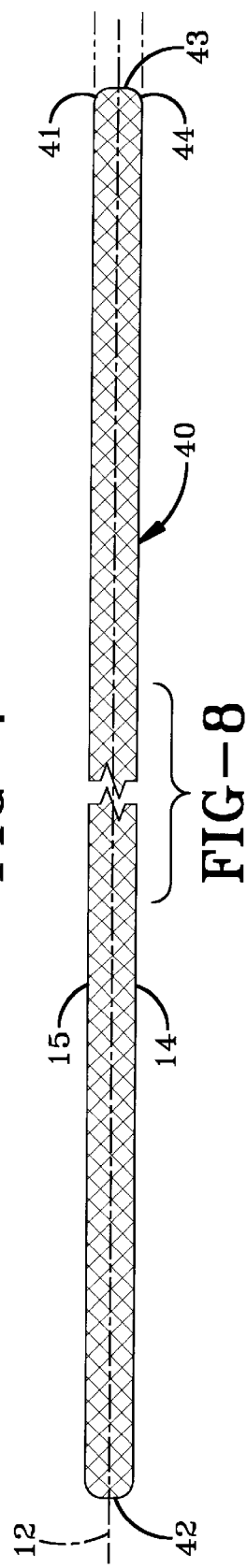

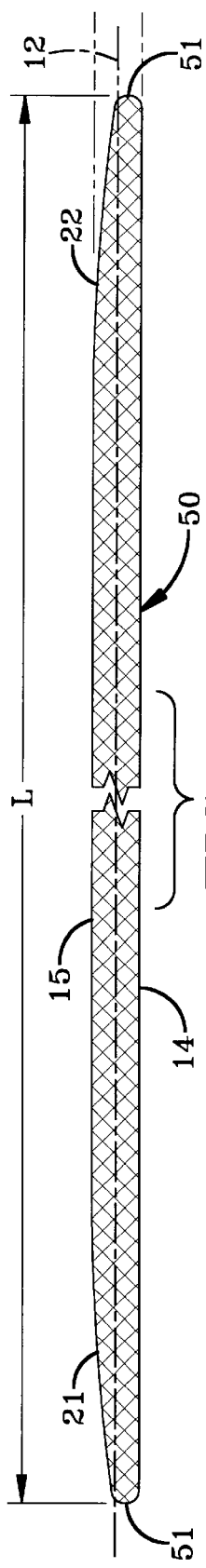
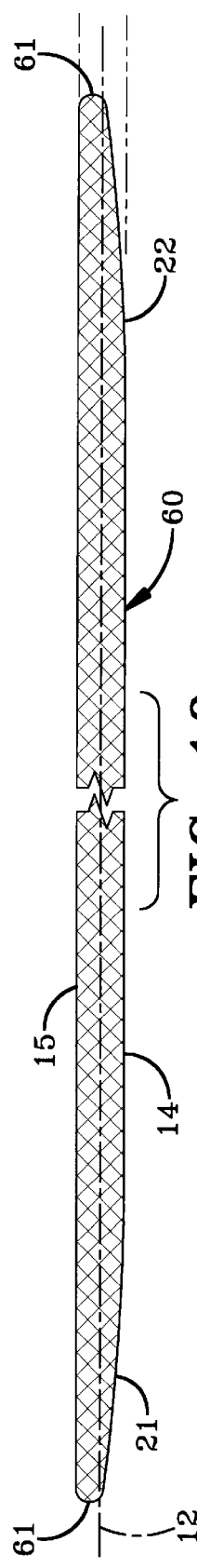
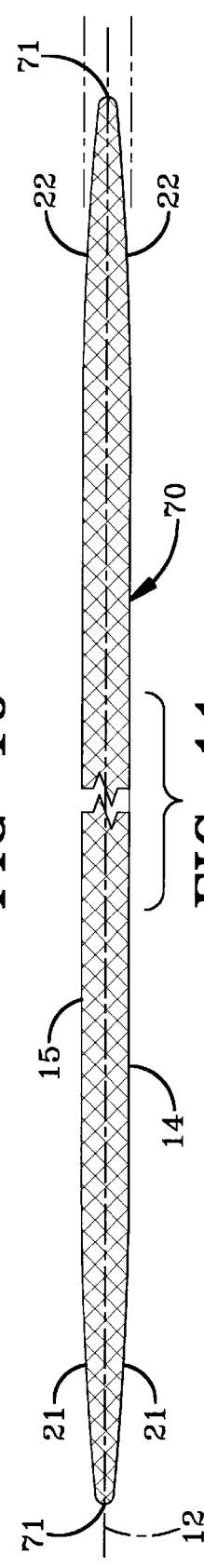
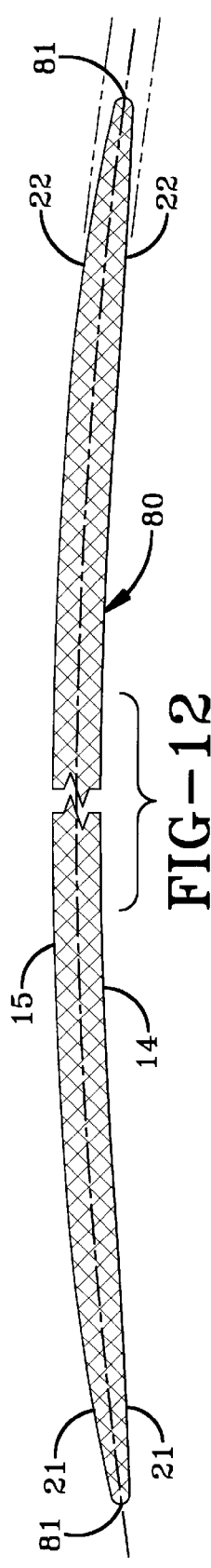

BAND ELEMENT FOR PNEUMATIC TIRE

CROSS REFERENCE TO RELATED APPLICATION

This application is a division of copending application Ser. No. 09/213,170, filed Dec. 17, 1998, now U.S. Pat. No. 6,112,791.

BACKGROUND OF THE INVENTION

1. Technical Field

The invention relates to reinforced resilient pneumatic tires and more particularly to a vehicle tire reinforced by a thin annular composite band which enables the tire to run in an unpressurized condition and to provide greater puncture resistance for the tire. More particularly, the invention relates to a pneumatic tire in which the internal band element is formed to resist interlaminar shear stresses and provide enhanced inflated and uninflated banded tire durability and puncture resistance.

2. Background Information

Various tire constructions have been devised over the years which enable a tire to run in an under-inflated or non-inflated condition, such as after receiving a puncture and loss of pressurized air, for extended periods of time and at relatively high speeds. This enables the vehicle operator to safely drive the vehicle to an appropriate location for repair or replacement of the punctured tire. Certain of these safety tires, referred to as "run flat tires", have been successful for certain applications and certain types of tire constructions. Most of these run flat tires achieve their run flat capability, by the placement of reinforcing layers or members of relatively stiff elastomeric material in the side walls of the tire which enable the tire to support the vehicle weight even with the complete loss of internal air pressure. Examples of such prior art run flat tire constructions which use such sidewall inserts are shown in U.S. Pat. Nos. 3,911,987; 3,949,798; 3,954,131; 4,067,372; 4,202,393; 4,203,481; 4,261,405; 4,265,288; 4,287,924; 4,365,659; 4,917,164; and 4,929,684.

In addition to these prior art run flat tires, various run flat tire constructions have been developed which utilize a thin annular band which extends circumferentially throughout the tire beneath the tread area. Examples of such banded run flat tires are shown in the following patents.

U.S. Pat. 4,428,411 describes a method to make a particular band for use in a run flat tire which uses a series of side-by-side elements in the form a helix. The band has hoop compression as against a conventional breaker belt that has no significant compressive strength but is used only to resist tension loads endured by the tire when pressurized.

U.S. Pat. Nos. 4,673,014 and 4,794,966 teach a method to acquire desirable prestressing in a fabricated band made of helical elements. Physically bending the larger diameter helix element around a smaller mandrel and securing it with a resin impregnated tape acquires a desirable level of prestressing.

U.S. Pat. No. 4,456,048 teaches a method of acquiring a change in band stiffness as a function of deflection. The band has a lower stiffness for normal pressurized operation and has a higher stiffness to support load when the tire is uninflated and experiences larger deflection.

Japanese Patent application No. JP 63141809 discloses a run flat tire having a banded element which is formed of layered strips of materials, such as an arramed filament which is impregnated with a high elasticity epoxy resin, which after hardening provides a stiffened band. The tire of this disclosure requires that elastomeric side wall inserts be utilized in combination with the band in order to achieve the desired run flat characteristics.

Other run flat banded pneumatic tires are shown in U.S. Pat. Nos. 4,111,249; 4,318,434; 4,428,411; 4,459,167; and 4,734,144.

Banded tires have been fabricated with band materials made of steel, aluminum, titanium, and epoxy and thermoplastic composites with glass, KEVLAR (aromatic polyamide) and graphite fiber reinforcement. The common failure mode with such lightweight, economical laminate band constructions is interlaminar shear within the band's primary bending neutral axis. This is a fatigue failure and is directly related to the spectrum of cyclic operating stress. As in all fatigue failures, the lower the stress, the longer the operating life. This problem of fatigue failure occurring along the neutral axis of the band resulting in interlaminar shear can be reduced by the prestressing the band during its manufacture, as described in U.S. Pat. No. 5,879,484.

Numerous prior art pneumatic tires have been provided with an annular band usually of metal, to resist puncture by sharp objects protruding through the tread area. Although these prior art puncture resistant tires utilizing a metal band provide the desired puncture resistance, in most cases, the metal band effects the ride characteristic of the tire and the life expectancy thereof.

Thus, it is desirable to provide a band element for run flat pneumatic tires and for pneumatic tires having greater puncture's resistance, with increased resistance to interlaminar shear stress in the inflated deflected banded tire, the uninflated deflected banded tire and the condition of a banded tire encountering a road surface anomaly, which is accomplished without materially increasing the difficulty of the manufacturing process for producing the band element and without materially increasing the cost thereof. The band element of the present invention achieves these results.

SUMMARY OF THE INVENTION

Objectives of the invention include providing an improved pneumatic tire that is substantially similar in ride, comfort, durability and operation as conventional pneumatic tires, yet which is able to be operated safely at reasonable speeds and for a sufficient number of miles after loss of internal pressurization.

Another objective of the invention is providing such a pneumatic tire and band element therefor which has enhanced load carrying capability, improved endurance by minimizing band stress, and in particular minimizes interlaminar shear stresses heretofore resulting in destruction of the band element.

Another objective of the invention is to provide such a band element which has enhanced inflated durability achieved by increasing the interlaminar shear strength of the band by reducing circumferential strain and circumferential stress which is achieved by contouring of the band edges, and in which the enhanced durability is derived independent of other preferred band dimensions such as diameters, modulus of elasticity, prestressing of the band, etc.

A still further objective of the invention is to provide such a band element which reduces interlaminar shear by contouring of the band elements irrespective of whether the band element is fabricated of materials such as laminated metals, thermoplastic and thermosetting materials and multilayer composites and is applicable to passenger tires, light truck tires, racing tires and tires with and/or without tread patterns.

Another objective of the invention is to provide such a run flat tire which has increased puncture resistance from the tread contacting road hazards, which can be manufactured at a cost and weight competitive with conventional non run flat tire constructions and which will permit the elimination of a spare tire conventionally required in automobiles thereby providing a cost saving to vehicle manufacturers and owners.

A further objective of the invention is to provide such a band element in which the interlaminar shear strength is increased by coating the tapered outer end portions with a graphite fiber filled epoxy resin.

These objectives and advantages are improved by a thin annular band for embedding in the crown portion of a pneumatic tire, said band having an axial width and a radial thickness with a neutral axis extending generally through the center of the band in an axial direction, said band being a composite member formed of a plurality of layers of an elongated strip material and having inner and outer annular axially extending surfaces terminating in a pair of outer end portions and a pair of end edges with certain of said end portions being tapered toward said pair of end edges.

These objectives and advantages are further obtained by a pneumatic tire having an elastomeric casing with a tread portion formed in a crown portion thereof and sidewalls extending from the crown portion to generally annular beads adapted to normally seat themselves in an air tight secured: relationship with a wheel; an annular band embedded in the crown portion having an axial width and a radial thickness with a neutral axis extending generally through the center of the band in an axial direction, said band being a composite member formed of a plurality of layers of elongated strip material and having inner and outer annular axially extending surfaces terminating in a pair of outer end portions and a pair of end edges with certain of said end portions being tapered toward said pair of end edges.

BRIEF DESCRIPTION OF THE DRAWINGS

Preferred embodiments of the invention, illustrative of the best modes in which applicants have contemplated applying the principles, are set forth in the following description and are shown in the drawings and are particularly and distinctly pointed out and set forth in the appended claims.

FIGS. 5–12 are enlarged fragmentary sectional views of various embodiments of band elements having different end and edge configurations;

Similar numerals refer to similar parts throughout the drawings.

DESCRIPTION OF THE PREFERRED EMBODIMENTS

Figure 1:
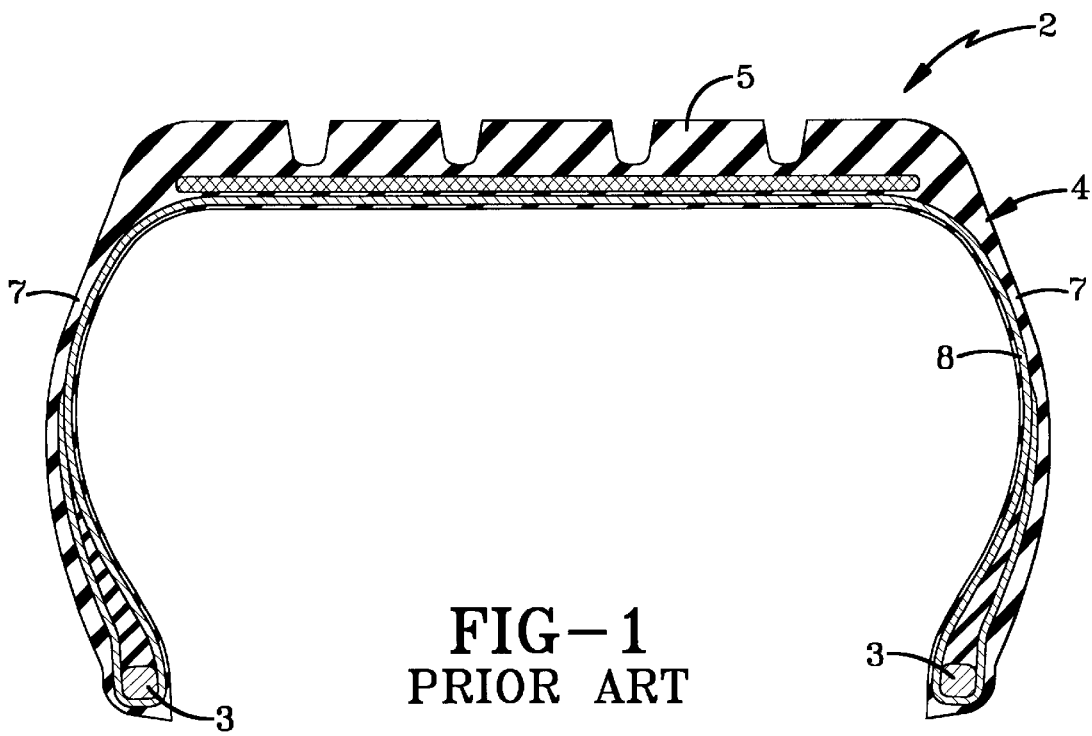
FIG. 1 is a sectional view of a prior art run flat tire having a band element incorporated therein.
Figure 2:
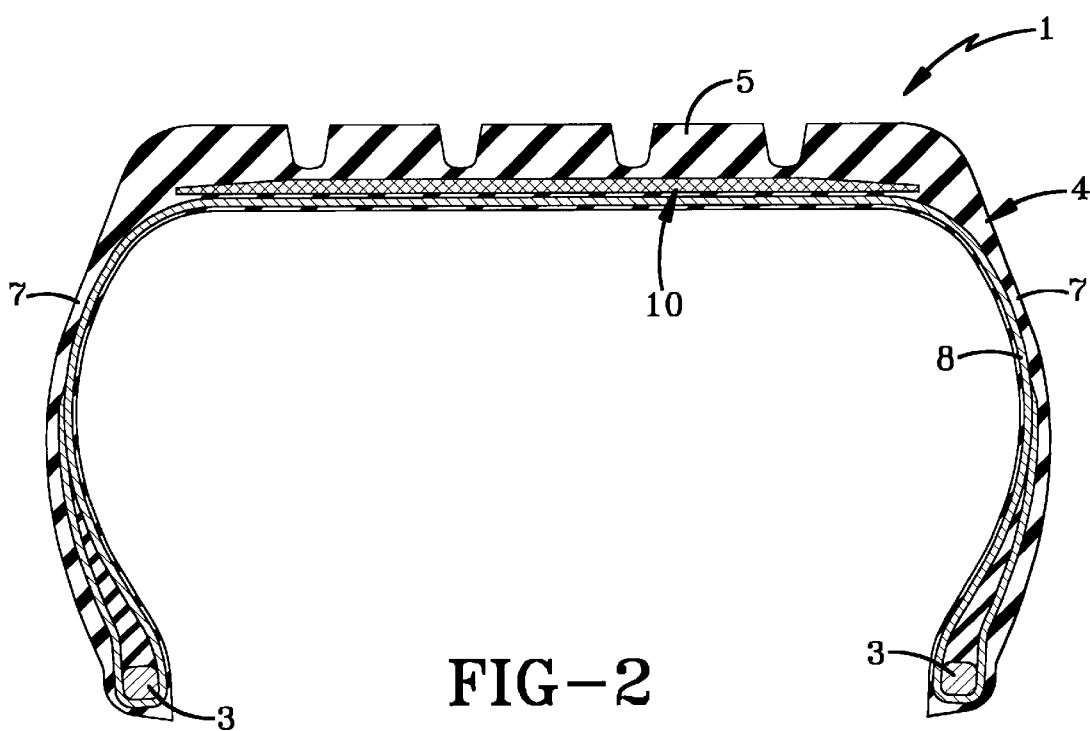
FIG. 2 is a sectional view similar to FIG. 1 showing the improved band element incorporated within a run flat tire.

The improved pneumatic tire of the present invention containing the unique band element is indicated generally at 1, and is shown in cross section in FIG. 2. Most of the components of tire 1 are of a conventional design and construction such as shown in the prior art banded tire of FIG. 1 indicated generally at 2. Tire 1 as well as tire 2 consists generally of a pair of beads 3 which are adapted to be seated in an air tight relationship on a wheel (not shown). Tires 1 and 2 further have a carcass or casing 4 having an outer peripheral tread portion 5 formed in a crown region thereof, and sidewalls 7 extending on both sides from the crown portion to beads 3. Tread 5 is formed with a usual tread pattern depending upon the particular characteristics to be achieved by the pneumatic tire and the particular vehicle on which the tire will be mounted.

Sidewalls 7 of the casing are reinforced by usual radial reinforcing elements 8 which extend throughout the sidewalls and are turned up about beads 3. As is well known in the art, sidewall plies are reinforced fibers composed of rayon, nylon, polyester, steel and other types of known materials. These sidewall reinforcements extend from at least the crown portion of the tire and throughout the sidewalls to the bead area thereof.

In accordance with one of the main features of the present invention, an improved annular stiffening band indicated generally at 10, is mounted within the crown portion of the tire radially beneath the tread and extends circumferentially throughout the tire and extends generally throughout the width of the tread. Band 10 is operatively connected to the sidewall reinforcing elements 8 either physically or through the intervening elastomeric material of the crown portion and tread which bonds the band to the reinforcing elements and radially stabilizes the band. Band 10 is relatively thin in contrast to its width and can range in width between 6 and 12 inches and in thickness generally between 0.1 and 0.2 inches depending upon the particular tire in which it is bonded. It is also understood that tire 1 will have a usual innerliner, gum abrasive strips and other components present in a conventional pneumatic tire which are not shown in FIG. 1 or discussed in further detail.

As discussed above, the main object of the invention is the formation of band 10 so as to provide sufficient load carrying capability with improved endurance by eliminating or materially reducing interlaminar shear by simple contouring of the band edges. As described in U.S. Pat. No. 5,879,484 assigned to the same assignee of the present application, the problem of fatigue failure occurs along the neutral axis 12 as the band element undergoes cyclic stresses both when in the inflated and uninflated conditions as the central footprint region of the tire and adjacent band element conforms to the road surface for a short distance on either side of the center of the tire. The change in the band element axial geometry from circular to flat causes a change in the stress/strain regime within the band element caused by flattening of the band element. Consequently, in the central footprint region, the fibers along the inside diameter of the band element are in tension and elongate while the fibers along the outside diameter of the band element are in compression and are shortened. These forces are experienced to the greatest degree along the axis of the band element ultimately resulting in interlaminar shear of the band element beginning at the neutral axis thereof.

The radius of the band element is largely determined by the tire size and thus can be changed only within narrow limits. The band element radial thickness will be determined so as to give acceptable band element outer fiber endurance as experienced by those fibers alternating between tension and compression. Banded tire durability including both inflated and uninflated conditions is limited by the interlaminar shear strength of the band element. More specifically, band element durability limited by failure due to interlaminar shear initiates near the axial ends of the band element along the neutral axis and progresses towards the axial center of the band element. Thus, it has been found to be advantageous to decrease interlaminar shear stress near the axial ends of the band element and thereby improve band element durability. This is achieved in the present invention as described further below, by modifying the geometry of the axial ends of the band element which decreases the band element radial thickness only near the axial ends of the bands in order to lower the tension and compressive stresses in the outer band element fibers and consequently decreases interlaminar shear in these regions.

Figure 4:
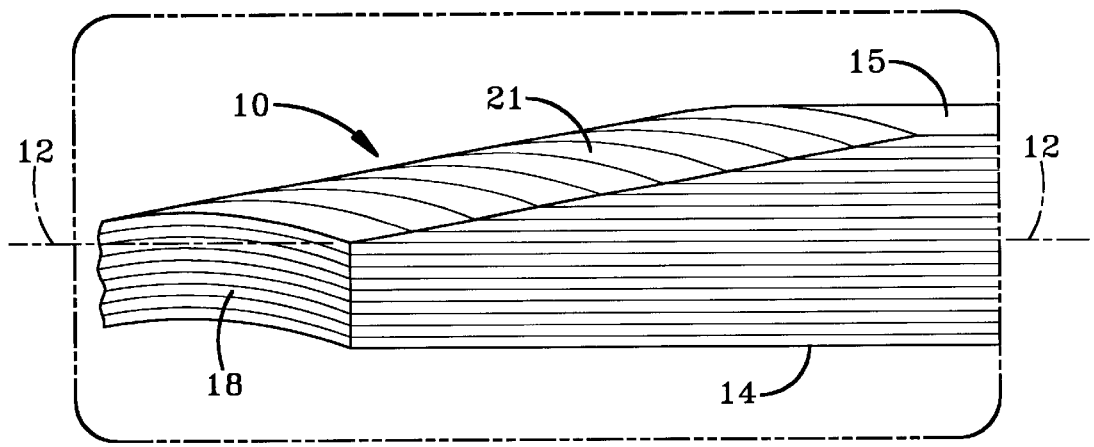
FIG. 4 is a greatly enlarged fragmentary view of the edge of the band element taken on line 4—4, FIG. 3.

In the preferred embodiment, the band element is a composite monolithic structure made of many layers as shown diagrammatically in FIG. 4. In a micro sense, the band element consists of a finite number of layers with each layer being made up of a finite number of widths of tape placed in a side-by-side fashion and with each tape being made of a combination of many fibers embedded in a suitable resin or matrix such as described in U.S. Pat. Nos. 5,879,484 and 6,148,885, the contents of which are incorporated herein by reference. It has been found that decreasing band element radial thickness near the axial ends of the band element is especially important for the preferred multi-layered composite band elements because of two important factors.

Monolithic composite band elements don't develop full strength in tension, compression or interlaminar shear within approximately 0.50 to 1.00 inches from the axial ends of the band element. These end effects are attributable to fiber wetting, void ratio, manufacturing, handling and processing of the band element. Monolithic multi-layer composite band elements have lower interlaminar shear strength vs. band elements made of steel, aluminum or homogeneous resin/fiber composites. The reason for this is that the shear strength of a multi-layer composite band element is lower between the layers vs. within the layers. Thus, the interlaminar shear failures tend to initiate at the interface between the layers near the neutral axis.

Figure 3:
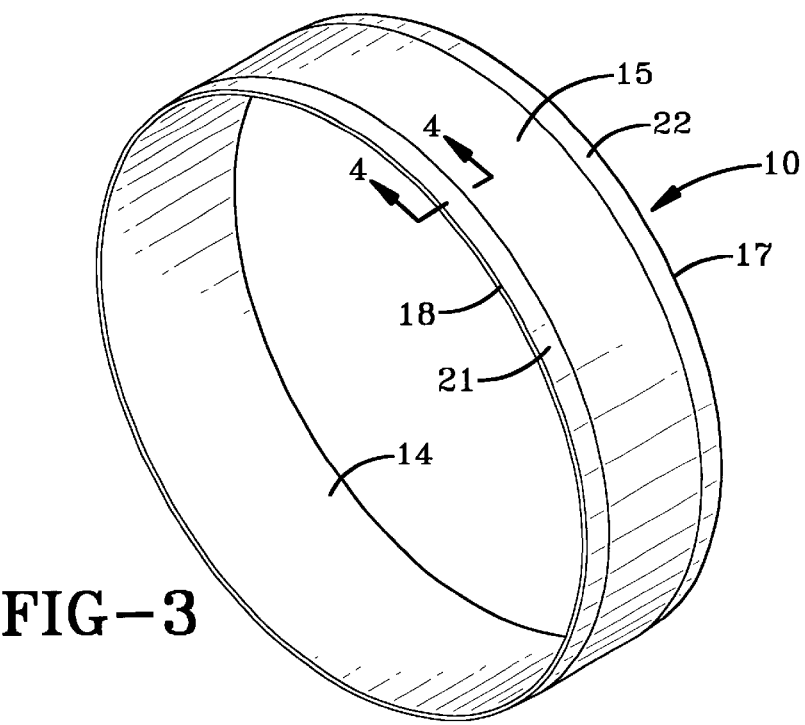
FIG. 3 is a perspective view of the improved band element of the present invention.
Figure 5A:
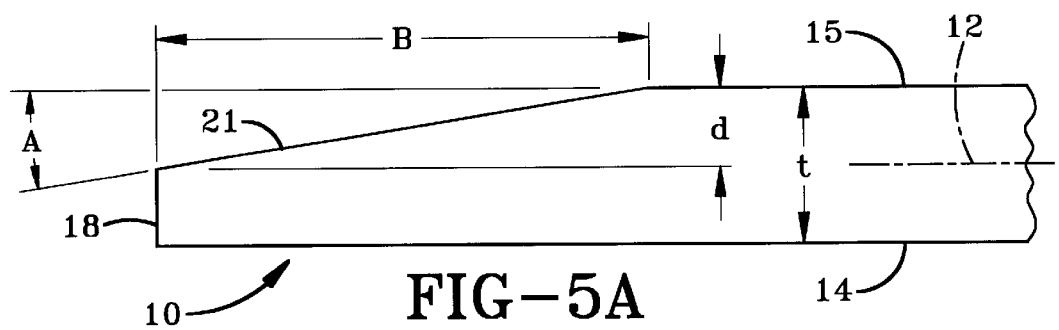
FIG. 5A is an enlarged fragmentary elevational view similar to FIG. 4.

This reduction in the radial thickness of the axial ends of the band element in order to minimize interlaminar shear stress can be obtained by various configurations as shown in FIGS. 5–12. Referring initially to FIG. 3, band element 10 has inner and outer axial surfaces indicated at 14 and 15 respectively, which terminate in a pair of end edges 17 and 18. Band element 10, shown in FIGS. 3, 4 and 5, is formed with tapered outer end portions 21 and 22 formed only on outer surface 15 of band 10. Referring to FIG. 5A, this angle of taper A preferably is generally within the range of between 5° and 45° with the axial length of end portions 21 and 22 indicated by B, being generally within the range of between 3% and 15% of the total axial length L of the band element. Alternatively, this can be indicated as d being generally within the range of one-fourth and three-fourth of thickness t. Also, it was noted that the outer end edges 17 and 18 are generally flat radially extending surfaces.

Another embodiment 20 is shown in FIG. 6 wherein tapered end portions 21 and 22 are formed only along inner surface 14 with edges 17 and 18 also being generally flat radially extending surfaces.

A modified band 30 is shown in FIG. 7 in which the tapered end portions 21 and 22 are formed in both the inner and outer surfaces 14 and 15 with end edges 17 and 18 being generally flat radially extending surfaces.

FIG. 8 shows a further modified band embodiment 40 in which inner and outer surfaces 14 and 15 are substantially parallel and flat throughout the entire axial length but with the end edges 41 and 42 being rounded which also have been found to reduce interlaminar shear even though the tapered end portions are merely the end radiuses 43 and 44 of the end edges.

Another embodiment of band element is indicated at 50, and shown in FIG. 9 in which inner surface 14 is generally substantially flat throughout its entire axial length with outer surface 15 having a tapered outer end portion 21 similar to that shown in FIG. 5 with the main difference being that the outer end edges 51 are generally rounded.

FIG. 10 shows a further modified band 60 similar in many respects to the embodiment 20 of FIG. 6 wherein the tapered end portions are formed only on inner surface 14 with the main difference being that the outer end edges 61 are rounded and are not generally flat radial extending surfaces as shown in band 20 of FIG. 6.

FIG. 11 shows a still further modified band element 70 which is similar in most respects to that of embodiment 30 of FIG. 7 wherein inner and outer surfaces 14 and 15 are generally flat and parallel with each other, but with both tapered outer end portions 21 and 22 terminating in round edges 70 instead of the generally flat radial extending surfaces 17 of band 30 of FIG. 7.

FIG. 12 shows another band 80 which has a generally continuous curved configuration with outer surface 15 being generally convex throughout its entire length with inner surface 14 being concave but at a slightly reduced radius of curvature so that the end portions 21 and 22 are tapered toward each other and preferably terminate in round edges 81 although the same could be generally flat radial extending surfaces as those shown in FIGS. 5, 6 and 7, without affecting the concept of the present invention.

Figure 13:
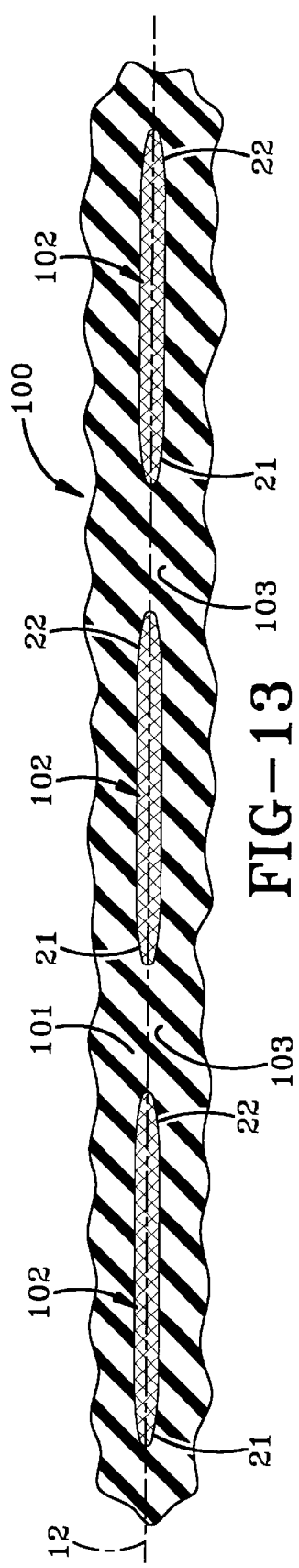
FIGS. 13 and 14 are enlarged fragmentary sectional view of two additional embodiments of band elements mounted within the tread of a run flat tire.

A modified pneumatic tire construction is indicated generally at 100, with only a small cross sectional portion of the crown area 101 being shown in FIG. 13. In this embodiment, three narrower band elements indicated generally at 102, are embedded within the crown portion and are in axial alignment therewith and separated by an intervening space 103. Band elements 102 can have the configuration of any of the band elements 20, 30, 40, 50, 60, 70 and 80 with only the configuration of band element 70 being shown therein. The only difference between the band elements of pneumatic tire 100 and those of tire 2 is that the axial lengths thereof are materially reduced to approximately ¼ the axial length of the band elements shown and described above which extend substantially continuous throughout the axial length of the tire.

Figure 14:
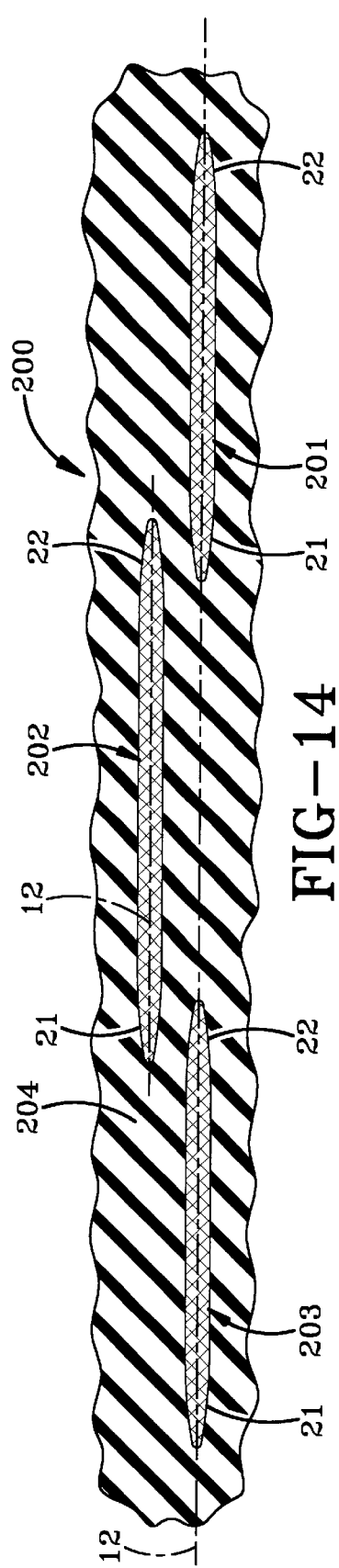

A further modified pneumatic tire is shown in FIG. 14 and is indicated at 200. Three band elements 201 are shown incorporated within the crown portion 202 thereof and are similar to that described above with respect to tire 100 with the main difference being that the outer two band elements 201 and 203 are in axial alignment with each other with the intermediate band element 202 being spaced radially from neutral axis 12 and with its ends in overlapping relationship to adjacent ends of the axial aligned bands 201 and 203. Again, the particular configurations of band elements 201, 202 and 203 shown in FIG. 14 are similar to band element 70 described above but can assume the configurations of the other band elements shown in the drawings and described above without, affecting the concept of the invention. Likewise, the number of band elements and their particular alignment within the crown portion of a pneumatic tire can also vary without affecting the concept of the present invention.

Figure 15:
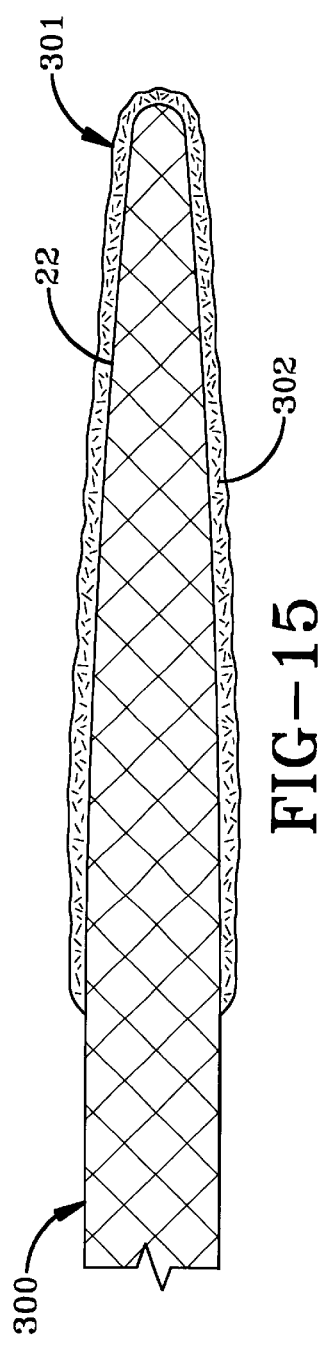
FIG. 15 is a greatly enlarged fragmentary elevational view of the right hand end of FIG. 11 having a coating of a graphite fiber filled epoxy thereon.

A still further modified embodiment is shown in FIG. 15 and is indicated generally at 300. Band element 300 is generally similar to the end of the band shown in FIG. 11 although the following discussion is applicable to any of the bands shown in the drawings and described above. The tapered end portions 21 and 22 of band element end 301 are coated with an epoxy 302 filled with a strengthening fiber arranged in a random order such as graphite, which will further enhance the interlaminar shear strength of the band. Other types of fiber filled epoxy coatings other than graphite can be used without affecting the concept of this feature.

In summary, the dominant mode of durability fatigue for the band element in banded tires has been described and simple modification to the axial ends of the band element has been shown and described which can reduce the level of strain in the inner fibers of the band element near the axial ends and more importantly this modification can reduce interlaminar shear stress at the neutral axis near the axial ends of the band element thereby reducing the interlaminar shear throughout the axial length of the band element thereby increasing durability of the band element and pneumatic tire in which it is incorporated.

Accordingly, the improved band element for pneumatic tire is simplified, provides an effective, safe, inexpensive, and efficient. device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved band element for pneumatic tire is constructed and used, the characteristics of the construction, and the advantageous, new and useful results obtained; the new and useful structures.

We claim:

1. A thin annular band for embedding in the crown portion of a pneumatic tire, said band having an axial width and a radial thickness with a neutral axis extending generally through the center of the band in an axial direction, said band being a single composite monolithic member formed of a plurality of layers of an elongated strip material, said strip material being a resin matrix embedded with fibers and having inner and outer annular axially extending surfaces terminating in a pair of outer end portions and a pair of end edges with the inner and outer surfaces of both of said end portions being tapered toward said pair of end edges.

2. The annular band defined in claim 1 in which the end edges are flat radially extending surfaces.

3. The annular band defined in claim 1 in which the end edges are rounded.

4. The annular band defined in claim 1 in which the inner and outer surfaces are flat.

5. The annular band defined in claim 4 in which the inner and outer surfaces are substantially parallel.

6. The annular band defined in claim 1 in which the inner surface is concave and the outer surface is convex.

7. The annular band defined in claim 6 in which the end edges are rounded.

8. The annular band defined in claim 1 in which the outer end portions have a fiber filled epoxy coating applied thereto.

9. The annular band defined in claim 8 in which the fiber filling is graphite.

10. The annular band defined in claim 1 in which the said tapered end portion has an angle of taper generally within the range of 5° and 45°.

11. The annular band defined in claim 1 in which the annular band has an axial length (L); and in which said tapered end portion has a length within the range of 3% and 15% of said length (L).

* * * * *